United States Patent [19]

Watanabe et al.

[11] Patent Number: 5,678,663
[45] Date of Patent: Oct. 21, 1997

[54] BRAKING APPARATUS AND ROLLING GUIDE UNIT ON WHICH IT IS EQUIPPED

[75] Inventors: Hitoshi Watanabe, Lincolnpark, N.J.; Tomoaki Kamata, Kanagawa, Japan

[73] Assignee: Nippon Thompson Co., Ltd., Tokyo, Japan

[21] Appl. No.: 558,508

[22] Filed: Nov. 16, 1995

[30] Foreign Application Priority Data

Nov. 17, 1994 [JP] Japan .................. 6-308151

[51] Int. Cl.⁶ ................................ F15B 15/08
[52] U.S. Cl. ........................ 188/67; 188/83
[58] Field of Search ............ 188/67, 83, 41–45; 384/43–50, 54; 104/290, 307; 105/463.1; 92/88; 414/749; 108/143; 33/1 M, 1 Q; 269/60, 55; 248/657, 661; 476/67, 70, 68

[56] References Cited

U.S. PATENT DOCUMENTS

| | | | |
|---|---|---|---|
| 2,928,502 | 3/1960 | Troften | 188/43 |
| 3,840,095 | 10/1974 | Matson | 188/67 |
| 4,234,059 | 11/1980 | Schaad | 188/43 |
| 4,377,220 | 3/1983 | Briggs | 188/44 |
| 4,615,515 | 10/1986 | Suzuta et al. | 188/43 |
| 4,926,982 | 5/1990 | Granbom | 188/67 |
| 5,111,913 | 5/1992 | Granbom | 188/67 |
| 5,326,197 | 7/1994 | Takei | 384/45 |
| 5,357,819 | 10/1994 | Takei | 108/143 |
| 5,362,157 | 11/1994 | Ichida | 384/45 |
| 5,460,452 | 10/1995 | Hara | 384/45 |
| 5,469,940 | 11/1995 | Yamamoto et al. | 188/67 |
| 5,473,992 | 12/1995 | Takei | 188/36 |

*Primary Examiner*—Douglas C. Butler
*Attorney, Agent, or Firm*—Sughrue, Mion, Zinn, Macpeak & Seas, PLLC

[57] ABSTRACT

A braking apparatus that achieves an extremely small number of components, simple construction and reduced manufacturing cost and so forth, along with a rolling guide unit on which it is equipped. The above advantages are obtained by providing a braking member, formed by integrating a base portion and clamping portions into a single unit, and clamping a track rail with those clamping portions by elastically deforming the base portion. According to this constitution, the member for producing braking force by clamping the track rail is essentially only that braking member.

12 Claims, 13 Drawing Sheets

BRAKING APPARATUS AND ROLLING GUIDE UNIT ON WHICH IT IS EQUIPPED

BACKGROUND OF THE INVENTION

1. Field of the Invention

The present invention relates to a rolling guide unit that is equipped on the movement mechanism of, for example, a machine tool, which guides a movable object to be moved with high accuracy, and a suitable braking apparatus provided on said rolling guide unit and so forth for fixing said movable object.

2. Description of the Prior Art

An example of this type of linear motion rolling guide unit equipped with a braking apparatus of the prior art is shown in FIGS. 1 through 3. As shown in the drawings, this linear motion rolling guide unit has two track rails 3 that are fixed mutually in parallel by bolts 2 on bed 1 (see FIG. 1) equipped on a machine tool and so forth, and for example two, sliders in the form of slide units 5 that are guided by said track rails 3. A movable object in the form of rectangular plate-shaped table 8 is fastened on these slide units 5 by bolts 9 (see FIG. 1). As shown in FIGS. 2 and 3, a total of four tracks in the form of track surfaces 3a are formed in parallel along the lengthwise direction in track rails 3, with two track surfaces each on the left and right sides. Both of the above-mentioned slide units 5 have four rolling element circulating paths (not shown) that include load bearing tracks that respectively correspond to each track surface 3a. A large number of balls (not shown) are arranged and contained within each of said rolling element circulating paths that bear the load between track rails 3 and slide units 5 by circulating while rolling over track surfaces 3a accompanying movement of slide units 5.

As shown in the drawings, braking apparatus 11 is arranged near one of the two slide units 5 provided. This braking apparatus 11 brakes slide units 5 with respect to track rails 3 so that the above-mentioned table 8 becomes fixed, and is composed in the manner described below.

Namely, the above-mentioned braking apparatus 11 has stationary plate 14, which together with being arranged on the lower surface of the above-mentioned table 8 so as to be positioned at a prescribed interval with respect to the upper surface of track rail 3, is fastened to said table 8 with bolts 13, a pair of moving braking members 16 and 17 that are arranged on both sides of said stationary plate 14 so as to approach and move away from the lateral surfaces of track rail 3 (indicated with arrows $Y_1$), and tightening screw 19 that screws into both said braking members 16 and 17 for moving each of said braking members. Furthermore, lever 20 is attached to said tightening screw 19, and tightening screw 19 is able to be turned by operation of said lever 20 by an operator.

More specifically, with respect to the above-mentioned tightening screw 19, threaded portions 19a and 19b (see FIG. 3) have mutually opposite threads with respect to both braking members 16 and 17. In addition, as shown in FIG. 3, coil spring 22 is juxtaposed between both said braking members 16 and 17 to apply force in the direction in which said braking members 16 and 17 move apart.

In the above-mentioned constitution, for example, a workpiece (not shown) is mounted on table 8, and said table 8 is suitably moved as shown with arrow F in FIGS. 1 and 2 by a driving device not shown. When table 8 reaches a desired position, it is stopped and fixed in position by the operation of braking apparatus 11 by an operator. More specifically, as shown in FIG. 2, when an operator turns lever 20 to the right, both braking members 16 and 17 approach the lateral surfaces of track rail to make contact and apply pushing pressure. As a result, a large frictional force is produced between both lateral surfaces of track rail 3 and both braking members 16 and 17, thus fixing the position of table 8. In this fixed state, the desired processing, such as cutting work and so forth, is performed on the above-mentioned workpiece.

In order to release the above-mentioned fixed state, the above-mentioned lever 20 should be turned in the opposite direction. As a result of turning in the opposite direction, both braking members 16 and 17 move away from track rail 3. As was described previously, since coil spring 22 is provided that applies force in the direction in which both braking members 16 and 17 move apart, separation from track rail 3 by both braking members 18 and 17 is promoted by the application of this force.

In the apparatus having the above-mentioned constitution, when the operation of the driving device that moves said table 8 is stopped, in many cases said table 8 becomes fixed in position with a certain degree of strength based on the rigidity of the power transmission mechanism equipped on said driving device. However, since the cutting force and so forth that is received during the time cutting work and so forth is being performed on the workpiece is relatively large, said fixed state is insufficient for attempting to dampen vibrations that are produced as a result of cutting and so forth, as well as to achieve uniformity of the surface properties of the processed surface of the workpiece. Accordingly, it is useful to obtain a solid fixed state using braking apparatus 11 as described above. In addition, with respect to other apparatuses that require a high degree of operational accuracy as well, such as an assembly apparatus that performs assembly of semiconductor components and so forth, if it performs precise work while maintaining a certain type of movable object with which it is equipped in a fixed state, the incorporating of a linear motion rolling guide unit that contains said braking apparatus 11 is effective in terms of achieving improved accuracy.

Braking apparatus 11, having the constitution described above, can be said to have the advantages of having a relatively simple construction in comparison with the various types of braking apparatuses, being inexpensive, having easy operation and not being susceptible to the occurrence of operation errors. However, since it is equipped with a large number of components, this problem must be solved in order to attempt to further reduce manufacturing cost.

SUMMARY OF THE INVENTION

In consideration of the above-mentioned disadvantages of the prior art, the object of the present invention is to provide a braking apparatus, which achieves an extremely small number of components, simple construction, and reduction in manufacturing cost and so forth, along with a rolling guide unit on which it is equipped.

In order to achieve said object, the braking apparatus according to the present invention is equipped with: a base portion that engages with a movable object in at least two locations, said movable object to perform relative motion with respect to a prescribed track rail, and is formed so that a gap is produced with said movable object between said two engaging portions; braking members having a plurality of clamping portions for clamping said track rail that are integrated with said base portion and extend from the vicinity of each of said engaging portions so as oppose both sides of said track rail with gaps in between; and, a pushing device for elastically deforming said base portion by pushing toward said movable object between said two engaging portions.

In addition, the rolling guide unit according to the present invention is equipped with: track rails in which tracks are formed along the lengthwise direction; sliders having a rolling element circulating path that includes load bearing tracks corresponding to said tracks, and which are able to freely perform relative movement with respect to said track rails and are coupled to a prescribed movable object; a plurality of rolling elements that are arranged and contained within said rolling element circulating path, and which bear the load by rolling along said tracks; and, a braking apparatus that mutually brakes said track rails and sliders; wherein, said braking apparatus is equipped with a base portion that engages with said movable object in at least two locations, and is formed so that a gap is produced with said movable object between said two engaging portions; braking members having a plurality of clamping portions for clamping said track rail that are integrated with said base portion and extend from the vicinity of each of said engaging portions so as oppose both side of said track rail with gaps in between; and, a pushing device for elastically deforming said base portion by pushing toward said movable object between said two engaging portions.

In the above-mentioned constitution, the above-mentioned base portion is elastically deformed by the pushing pressure applied by the above-mentioned pushing device, as a result of which, a fixed state is obtained by clamping of the track rails by inclination of said clamping portions. In addition, when said pushing pressure is released, the above-mentioned base portion performs restorative operation by means of its own resiliency, and the clamping portions are separated from the track rails.

BRIEF DESCRIPTION OF THE DRAWINGS

FIG. 18 is a vertical cross-sectional view showing the essential portion of a sixth variation of the braking apparatus shown in FIG. 7.

DESCRIPTION OF THE PREFERRED EMBODIMENTS

The following provides an explanation of a linear motion rolling guide unit including a braking apparatus as an embodiment of the present invention with reference to the attached drawings.

Figure 4:
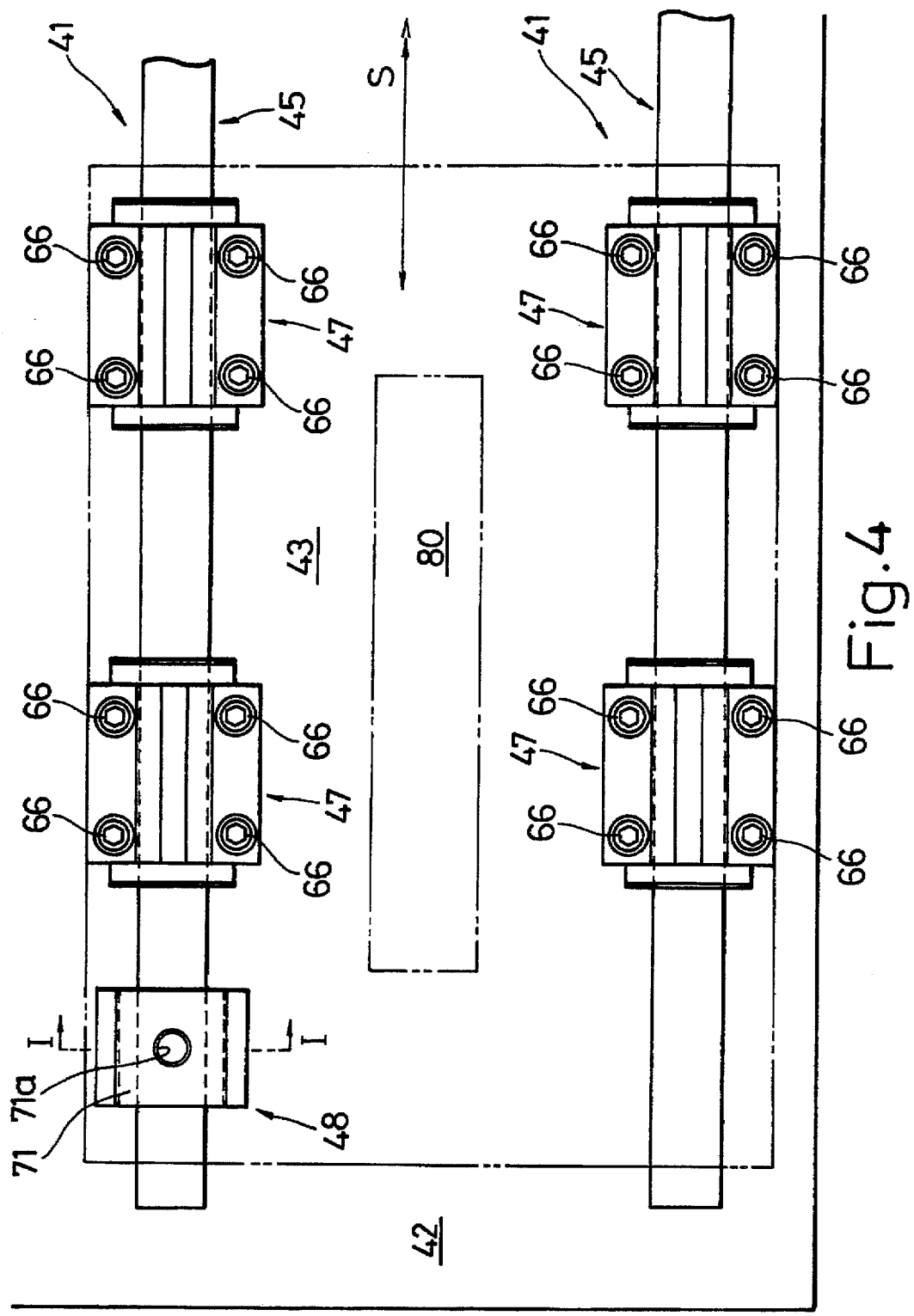
FIG. 4 is an overhead view showing a linear motion rolling guide unit as a first embodiment of the present invention mounted on the bed of a machine tool.

In FIG. 4, for example, two sets of this linear motion rolling guide unit are provided in parallel on bed 42 equipped on a machine tool in the form of a cutting machine (the entire cutting machine is not shown), and support a movable object in the form of rectangular plate-shaped table 43 so as to move it jointly.

Figure 5:
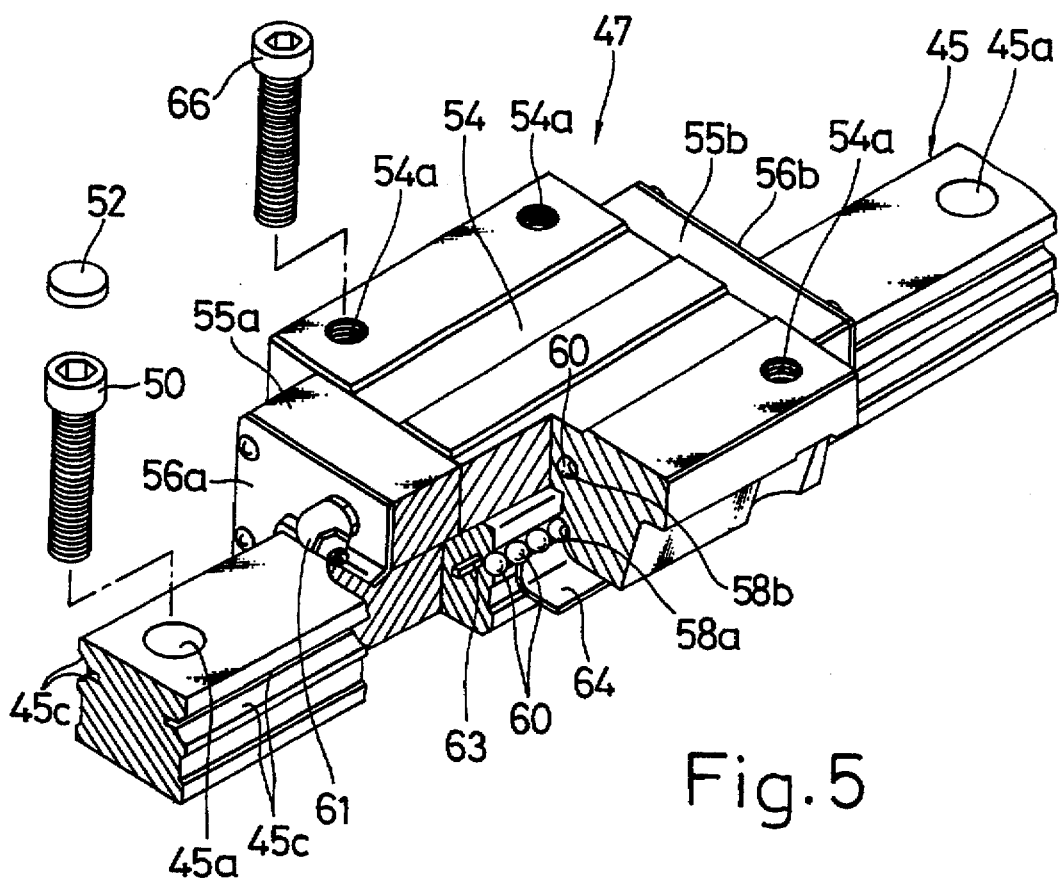
FIG. 5 is an exploded perspective view showing the slide unit and track rail equipped on the linear motion rolling guide unit shown in FIG. 4.

As shown in the drawing, both linear motion rolling guide units 41 respectively have two straight track rails 45 fixed on bed 42, two sliders in the form of slide units 47 able to freely perform relative movement with respect to said track rails 45, and braking apparatus 48 for braking each slide unit 47 with respect to each track rail 45. Furthermore, as shown in FIG. 5, track rails 45 are fastened to bed 42 by a plurality of bolts 50 (with hexagon sockets). More specifically, as shown in the drawing, insertion holes 45a, having a large diameter portion and small diameter portion, are formed in track rails 45 in which the head portions and threaded portions, respectively, of said bolts 50 are able to be inserted, and bolts 50 are inserted into said insertion holes 45a and screwed in so that their entirety is embedded in said insertion holes 45a. In addition, as shown in the drawing, after screwing in bolts 50, plugs 52 are fit into the openings of said insertion holes 45a, and lie in the same plane as the upper surface of track rail 45.

Figure 8:
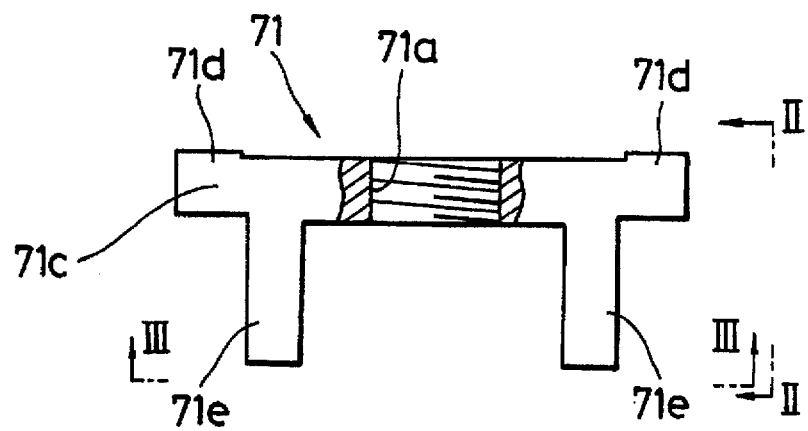
FIG. 8 is a front view, including a partial cross-section, of the braking members equipped on the braking apparatus shown in FIG. 7.

As shown in FIG. 5 and 8, tracks in the form of two track surfaces 45c each are formed in track rail 45 in its left and right sides along the lengthwise direction. As is clear from the drawings, slide Unit 47 has casing 54 juxtaposed about track rail 45, a pair of end caps 55a and 55b coupled to both the front and back ends of said casing 54, and seal members 56a and 56b attached to each of the outside surfaces of both said end caps.

Figure 6:
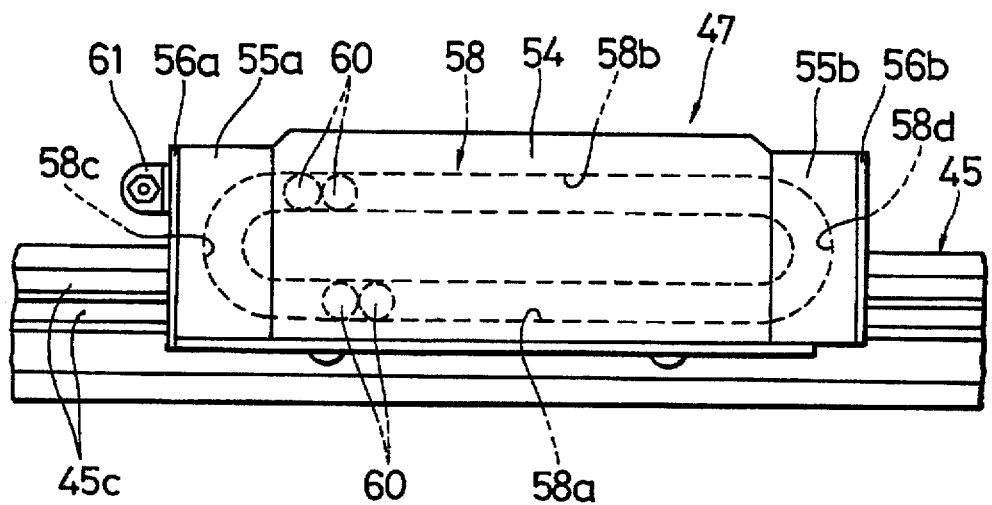
FIG. 6 is a side view of the slide unit and track rail shown in FIG. 5.

As shown in FIG. 6, rolling element circulating paths 58 corresponding to track surfaces 45c of track rail 45 are formed in slide unit 47. Furthermore, although FIG. 6 only shows rolling element circulating path 58 on one side since only one side of slide unit 47 is shown, an equal number of rolling element circulating paths are formed corresponding to track rails 45c on the left and right sides of track rail 45.

A large number of rolling elements in the form of balls 60 are arranged and contained within said rolling element circulating paths 58. These balls 60 bear the load between track rails 45 and slide units 47 by circulating while rolling along the above-mentioned track surfaces 45c accompanying movement of slide units 47. Furthermore, said rolling element circulating paths 58 are composed of load bearing track groove 58a and return path 58b formed linearly and in parallel in the above-mentioned casing 54, and roughly semicircular direction changing paths 58c and 58d formed in both caps 55a and 55b that mutually connect said load bearing track groove 58a and return path 58b at both their ends. Furthermore, the above-mentioned load bearing track groove 58a corresponds to track surface 45c of track rail 45. In addition, grease nipple 61 for providing a lubricant in the form of grease to each of the above-mentioned balls 60 is attached to end cap 55a. In addition, that indicated with reference numeral 83 in FIG. 5 is a retaining member that retains balls 80 to prevent them from falling out of the above-mentioned load bearing track groove 58a when slide unit 47 is removed from track rail 45. In addition, that indicated with reference numeral 84 in the same drawing is a lower surface seal.

As shown in FIG. 5, a plurality, in this case four, of threaded holes 54a are formed in the upper surface of casing 54 of slide unit 47. Table 43 shown in FIG. 4 is fastened to said casing 54 by bolts 88 (with hexagon sockets; shown in FIGS. 4 and 5) that screw into these threaded holes 54a.

On the other hand, braking apparatus 48, provided for braking each slide unit 47, and therefore table 48, on the above-mentioned track rails 45, is composed in the manner described below.

Figure 7:
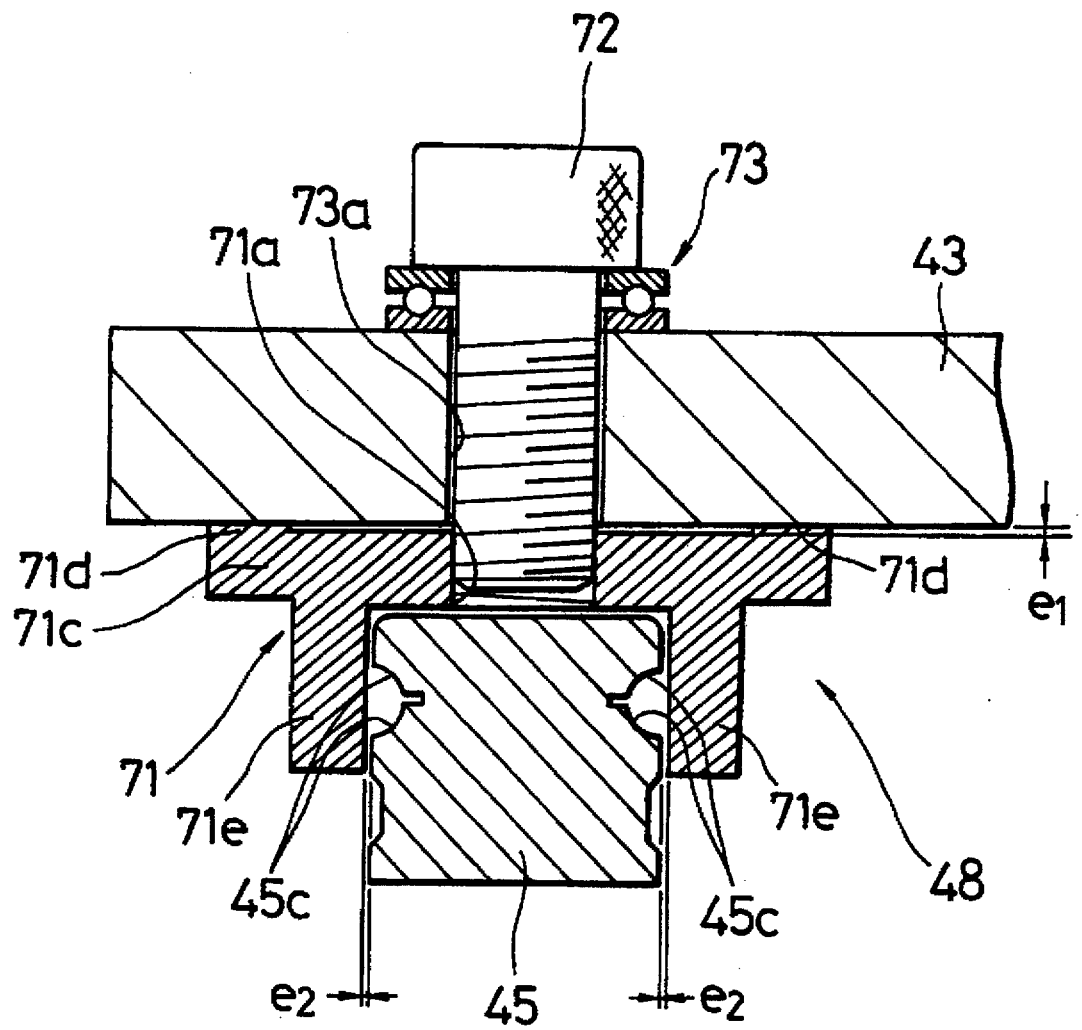
FIG. 7 shows the braking apparatus as claimed in the present invention in the form of a cross-sectional view taken along arrows I—I relating to FIG. 4.

As shown in FIG. 7, said braking apparatus 48 is equipped with braking member 71, bolt 72 (with hexagon socket) and thrust bearing 73. As shown in the drawing, this braking member 71 is arranged between table 43 and slide unit 45. In addition, bolt 72 is inserted from above into the threaded portion of insertion hole 43a formed in said table 43, and the end portion of said threaded portion screws into female threaded portion 71a formed in said braking member 71. In this case, thrust bearing 73 is a simple thrust bearing, being equipped with a pair of upper and lower track plates, and large number of balls arranged between both said upper and lower track plates, and juxtaposed between the head portion of said bolt 72 and table 43.

Figure 9:
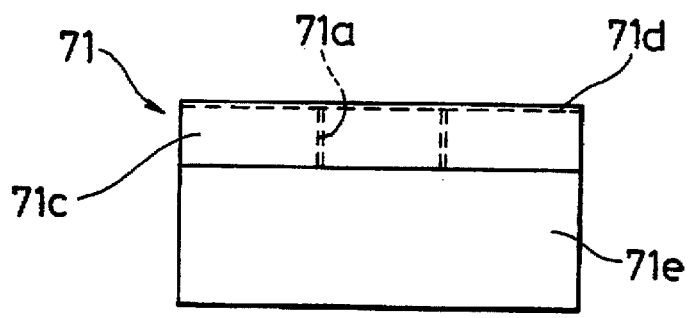
FIG. 9 is a view taken along arrows II—II relating to FIG. 8.
Figure 10:
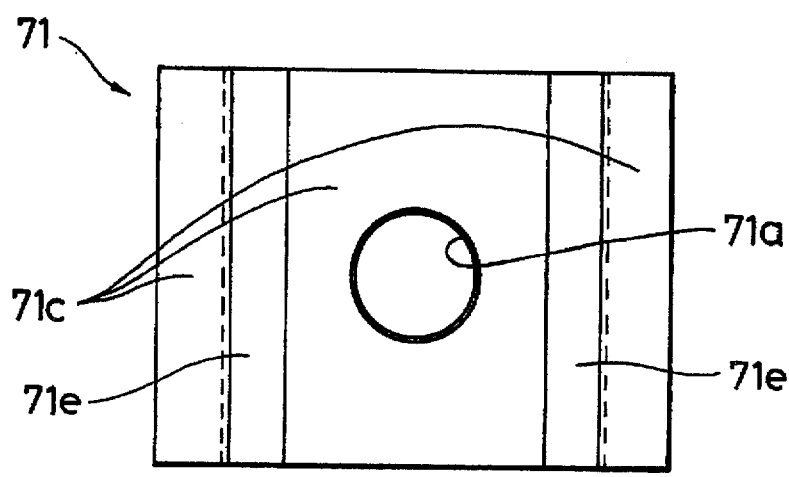
FIG. 10 is a view taken along arrows III—III relating to FIG. 8.

The details of the above-mentioned braking member 71 are shown in FIGS. 8 through 10. As shown in the drawings, said braking member 71 has base portion 71c, formed into the roughly the shape of a rectangular plate, that extends between the above-mentioned table 43 and track rail 45. Female threaded portion 71a, into which the above-mentioned bolts 72 screws, is formed in the center of this base portion 71c.

Projecting engaging portions 71d are formed over the entire length of the above-mentioned base portion 71c on the left and right sides on its upper surface, and engage with the lower surface of the above-mentioned table 43 at engaging portions 71d at two locations. Since said base portion 71c has each of engaging portions 71d projecting from its surface, gaps $e_1$ forms between both said engaging portions 71d and table 43.

A pair of clamping portions 71e are formed integrated into a single unit with the above-mentioned base portion 71c in both the left and right sides of the lower surface of said base portion 71c. Said clamping portions 71e are formed for clamping track rails 45 from both the left and right sides, are extending suspended downward from the vicinity of both the above-mentioned engaging portions 71d so as to oppose the lateral surfaces of tracks 45 while leaving slight gaps $e_2$.

The above-mentioned bolt 72, which is screwed into the above-mentioned base portion 71c, acts as a pushing device for elastically deforming said base portion 71c towards table 43 between the above-mentioned engaging portions 71d at two locations.

Continuing, the following provides an explanation of the operation of a cutting machine that contains a linear motion rolling guide unit having the constitution described above with reference to FIG. 11.

To begin with, a workpiece 80 is placed on table 43 shown in FIG. 4 and fixed using a fixing tool not shown. In this state, table 43 is suitably moved as indicated with arrow S in FIG. 4 by a driving device not shown. Next, table 43, namely workpiece 80, reaches the desired processing location at which processing is to be performed and stops. Then, an operator tightens bolt 72 shown in FIGS. 7 and 11 using a tool such as a wrench.

Figure 11:
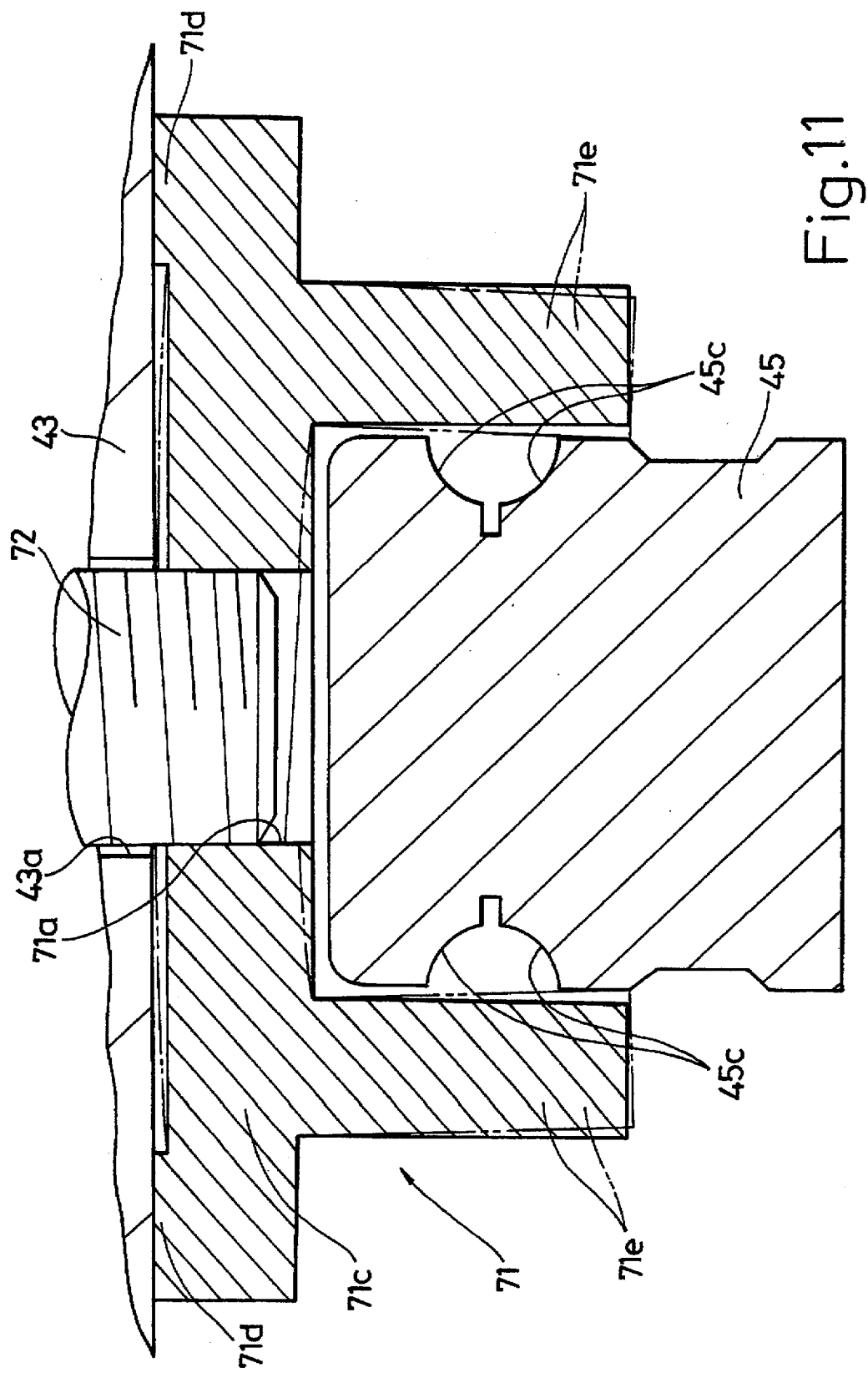
FIG. 11 an explanatory drawing of the operation of the braking apparatus shown in FIG. 7.

When bolt 72 has been tightened, since the head portion of said bolt 72 is received by table 43 by means of thrust bearing 73 as shown in FIG. 7, bolt 72 itself is not screwed in, but rather the tightening force acts on base portion 71c of braking member 71 in the form of pushing force towards table 43, thus causing said base portion 71c to be elastically deformed as shown in FIG. 11 with the broken line. As a result, both of the above-mentioned clamping portions 71e press against the lateral surfaces of track rails 45 on an incline to the inside resulting in clamping of said track rails 45 causing them to be fixed in position.

Once track rails 45 have been fixed as described above, the desired processing, in this case cutting work, is performed on workpiece 80 (see FIG. 4).

Once cutting work has been completed, the operator loosens the above-mentioned bolt 72. As a result, the pushing force applied to the above-mentioned base portion 71c of braking member 71 is released. Accordingly, said base portion 71c demonstrates restorative operation due to its own resiliency, causing both of the above-mentioned clamping portions 71e to move away from track rails 45 and the fixed state to be released.

The member for producing braking force by clamping track rails 45 of braking apparatus 48 having the constitution described above is essentially only the above-mentioned braking member 71, thus resulting in a smaller number of components in comparison with a braking apparatus that obtains a fixed state by means of a stationary plate (14) and a pair of braking members (16 and 17) as in the prior art. In addition, in said braking apparatus, since base portion 71c of braking member 71 demonstrates restorative operation due to its own resiliency when the pushing force by a pushing device in the form of the above-mentioned bolt 72 is released, and as a result, the above-mentioned clamping portions 71e move away from track rails 45, a special force applying device, such as the coil spring (22) used in the prior art to promote release of the fixed state, is no longer necessary, thus also reducing the number of components.

Thus, an extremely small number of components, simple construction, and reduced manufacturing cost are achieved. In addition, since the number of parts is reduced in this manner, there is less possibility of an operational error and so forth occurring caused by the penetration of dust and so forth into the relative operating portions of corresponding components, thus resulting in a high level of reliability.

In addition, in said braking apparatus 48, clamping portions 71e of braking member 71 are arranged between engaging portions 71d at two locations provided on base portion 71c to engage with table 43, namely farther to the inside than both said engaging portions 71d. According to this constitution, in comparison with the case of arranging said clamping portions 71e farther to the outside than said engaging portions 71d at two locations, the inclination of said clamping portions 71e is large, thereby resulting in increased braking force, in correlation with the angle of inclination of the curvature of deflection based on the elastic deformation of base portion 71c.

Moreover, in the above-mentioned braking apparatus 48, a fastening device in the form of bolt 72 is employed as a pushing device for elastically deforming the above-mentioned base portion 71c. Consequently, with respect to said pushing device as well, the construction is extremely simple, thus enabling a further reduction in manufacturing cost. However, this fastening device is not limited to bolt 72, but rather fastening devices having other constitutions can also be employed, an example of which consists of screwing in the lower end a stud bolt (not shown) into the above-mentioned base portion 71c, screwing a nut (not shown) onto the upper end of said stud bolt, and then tightening that nut to apply pushing force.

In addition, in the above-mentioned braking apparatus 48, as shown in FIG. 7, thrust bearing 73, which receives said fastening force in the form of an axial load, is juxtaposed between the portion to be turned during tightening equipped on bolt 72 that acts as the above-mentioned fastening device, namely the head portion of said bolt, and the fastened site of table 43, which receives the fastening force from said head portion. Accordingly, frictional force that is produced between the head portion of bolt 72 and table 43 is reduced to an extremely low level, thus enabling the obtaining of powerful fastening force, namely pushing force, with respect to minimal operating force.

However, in the present embodiment, a light metal such as aluminum or aluminum alloy is selected for the material of braking member 71 equipped on the above-mentioned braking apparatus 48. In addition, the above-mentioned bolt 72 that acts as a pushing device is also preferably formed from a light metal. As a result, the increase in inertial force when braking member 71 and bolt 72 are attached to table 43 is held to a low level, which is particularly effective in the case of operating table 43 at high speeds. However, a heavy metal such as iron may naturally also be used for the material of braking member 71 and bolt 72.

Figure 12:
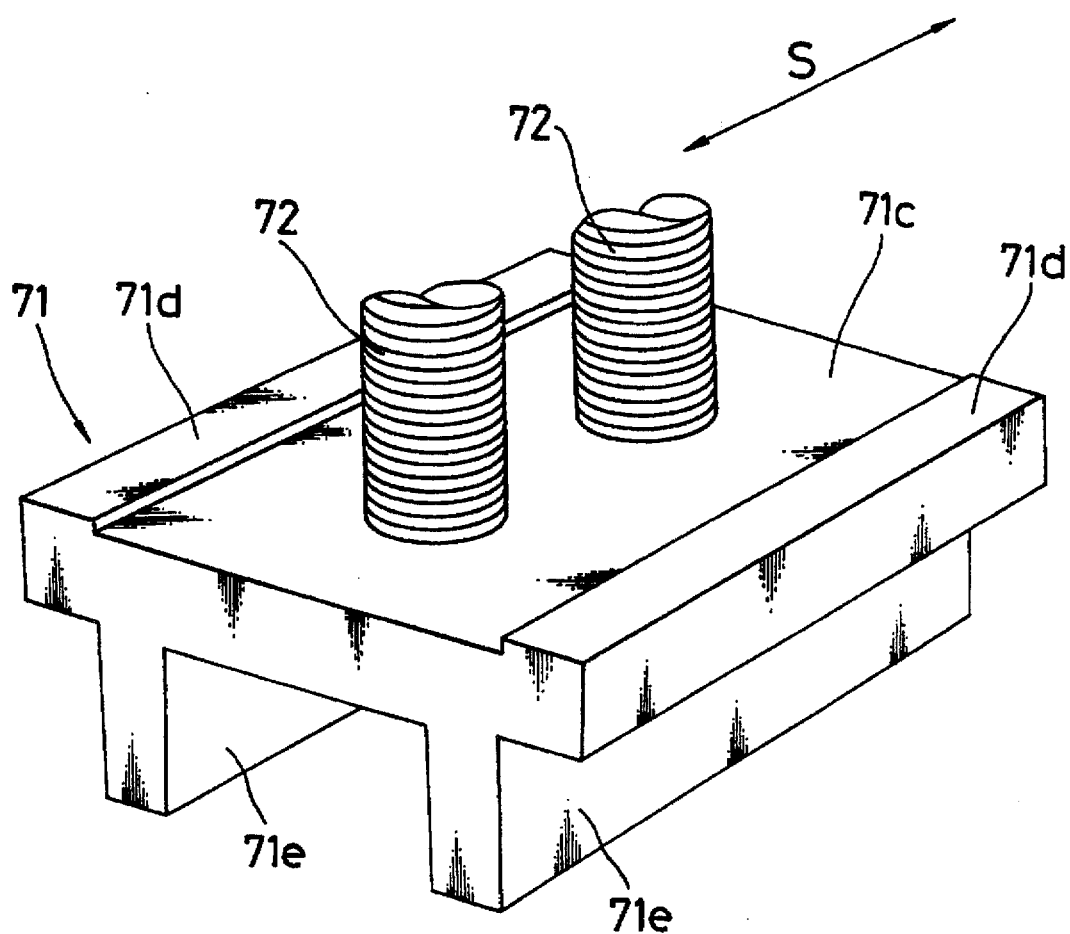
FIG. 12 is a perspective view showing the essential portion of a first variation of the braking apparatus shown in FIG. 7.

Moreover, although only one bolt 72, in the form of a pushing device that applies pushing force so as to elastically deform base portion 71c of the above-mentioned braking member 71, is provided in the present embodiment, a plurality, namely two as in FIG. 12, may also be provided. However, said two bolts 72 are arranged in a row in direction S (see FIG. 4) of relative motion of table 43 (see FIG. 4) with respect to track rails 45 (see FIG. 4). By arranging a plurality of pushing devices in a row in this manner, a large braking force can be produced thus enabling the obtaining of a rigid fixed state.

In addition, although an ordinary bolt 72 with hexagon socket is used as a pushing device for applying pushing force so as to elastically deform base portion 71c of the above-mentioned braking member 71 in the present embodiment, each of the bolts indicated below may also be employed.

Figure 13:
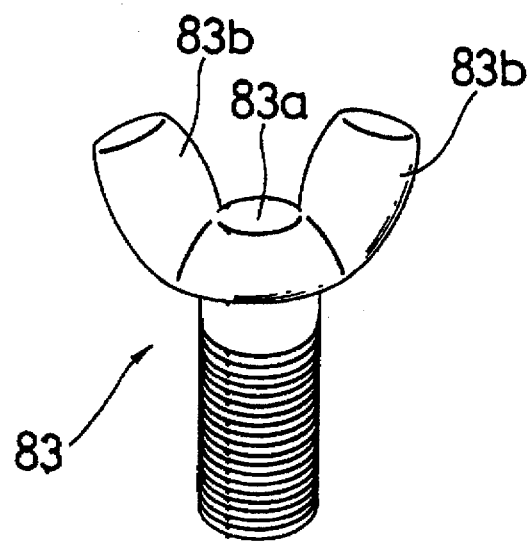
FIG. 13 is a perspective view of a wing bolt that is an essential portion of a second variation of the braking apparatus shown in FIG. 7.

The first example is wing bolt 83 shown in FIG. 13. As shown in the drawing, said wing bolt 83 is provided with handles in the form of wings 83b for applying rotational force to head portion 83a on the portion to be rotated during fastening, namely said head portion 83a.

Figure 14:
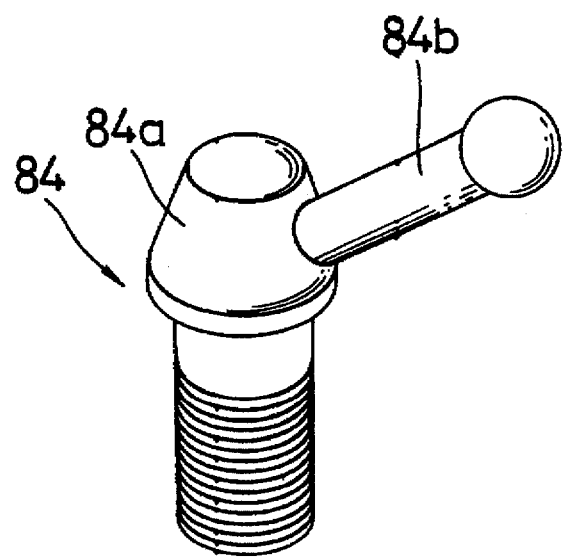
FIG. 14 is a perspective view of a bolt that is an essential portion of a third variation of the braking apparatus shown in FIG. 7.

Another example is bolt 84 shown in FIG. 14. As shown in the drawing, a handle in the form of lever portion 84b for applying rotational force to head portion 84a on the portion to be rotated during fastening, namely said head portion 84a.

Figure 1:
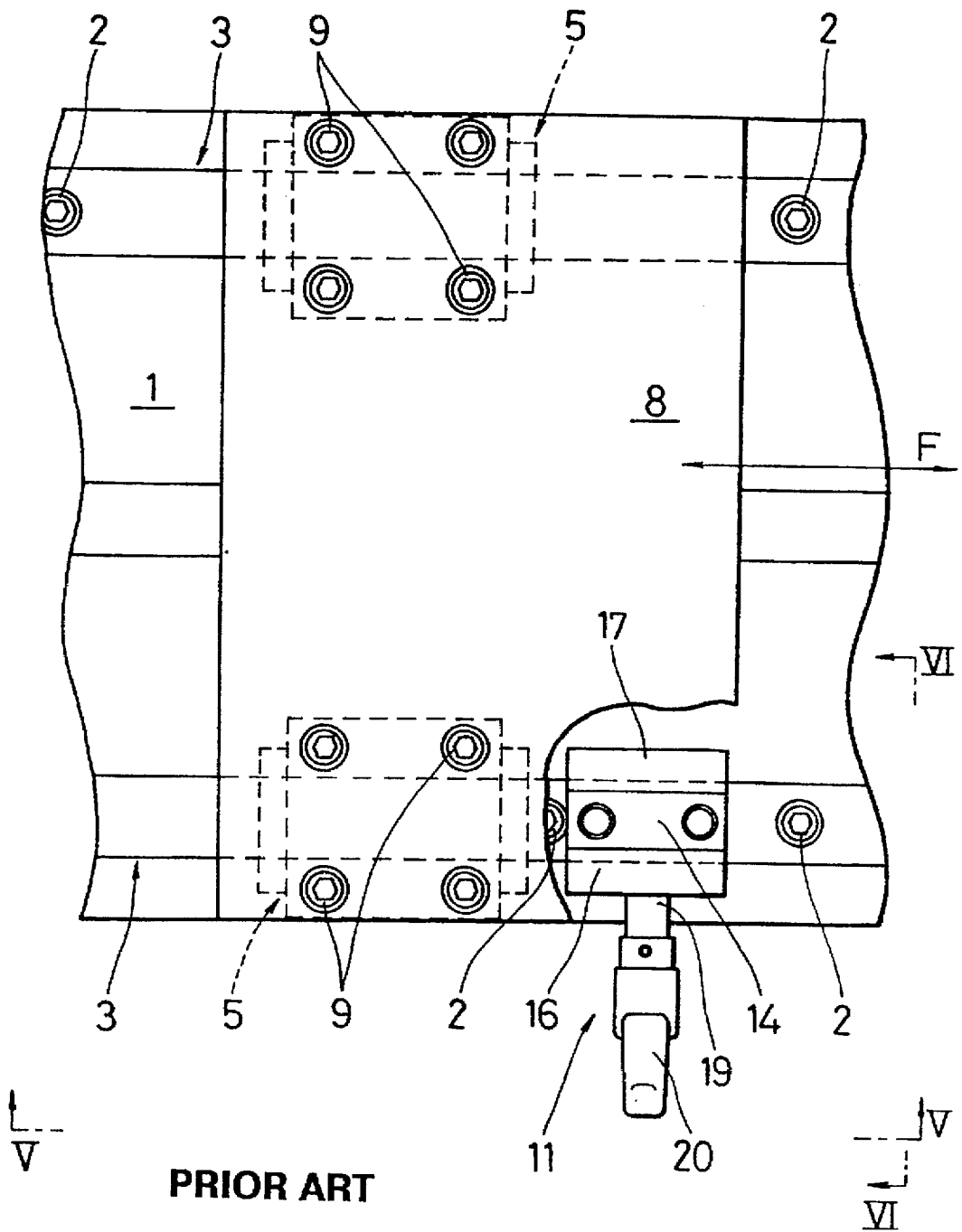
FIG. 1 is an overhead view, including a partial cross-section, showing the rolling guide unit containing a braking apparatus of the prior art mounted on the bed of a machine tool and so forth.
Figure 2:
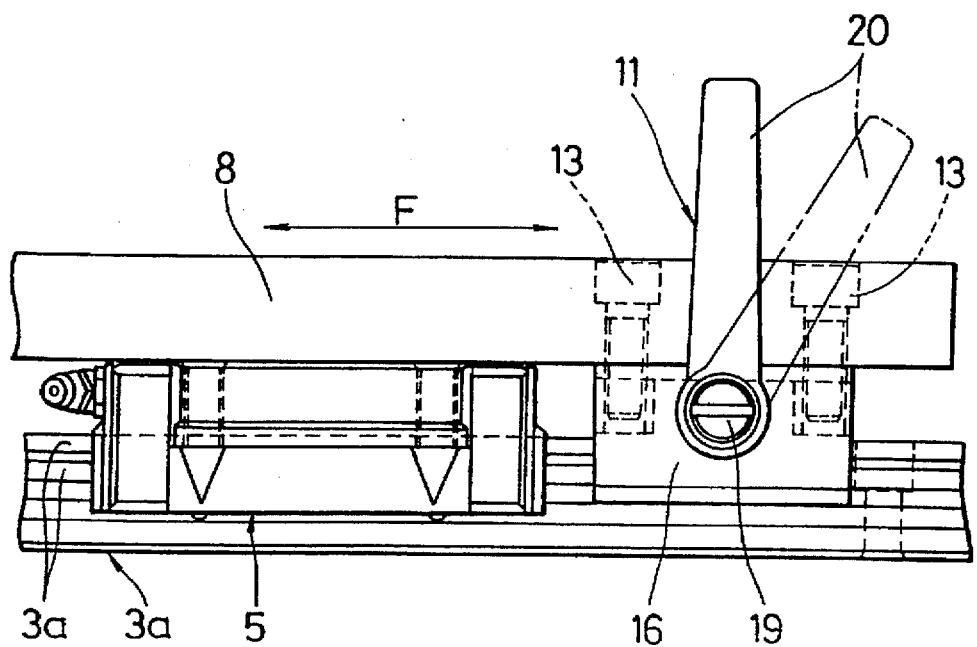
FIG. 2 is a view taken along arrows V—V relating to FIG. 1.
Figure 3:
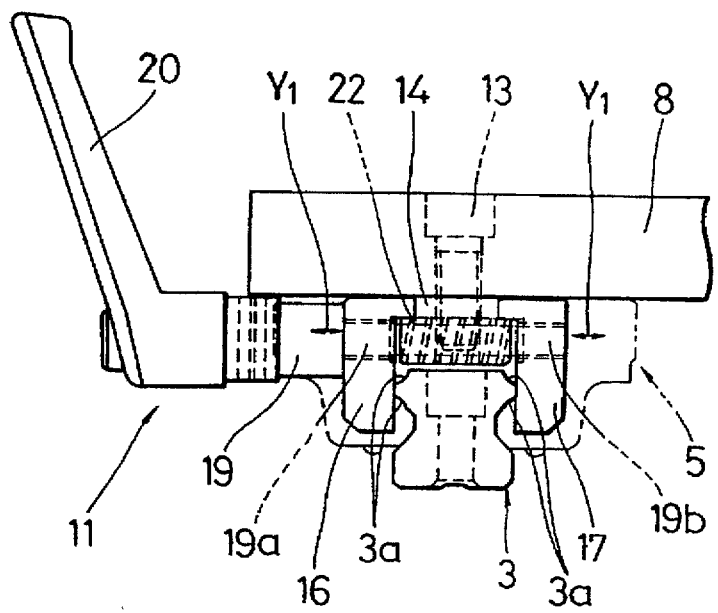
FIG. 3 is a view taken along arrows VI—VI relating to FIG. 1.

By using bolts equipped with various types of handles as described above, the operator is able to operate and rotate said bolt with his own hands, thus eliminating the need for the use of a tool such as a wrench, and leading to improved workability. In this case, as indicated in the embodiment, if the head portion of each of these types of bolts is arranged to be on the upper surface of table said handle will not interfere with said table 43, thus enabling table 43 to be made large, namely having a large surface area. Incidentally, in the example of the prior art shown in FIG. 3, if table 8 is made excessively large, the handle in the form of lever 20 ends up interfering with said table 8.

Figure 15:
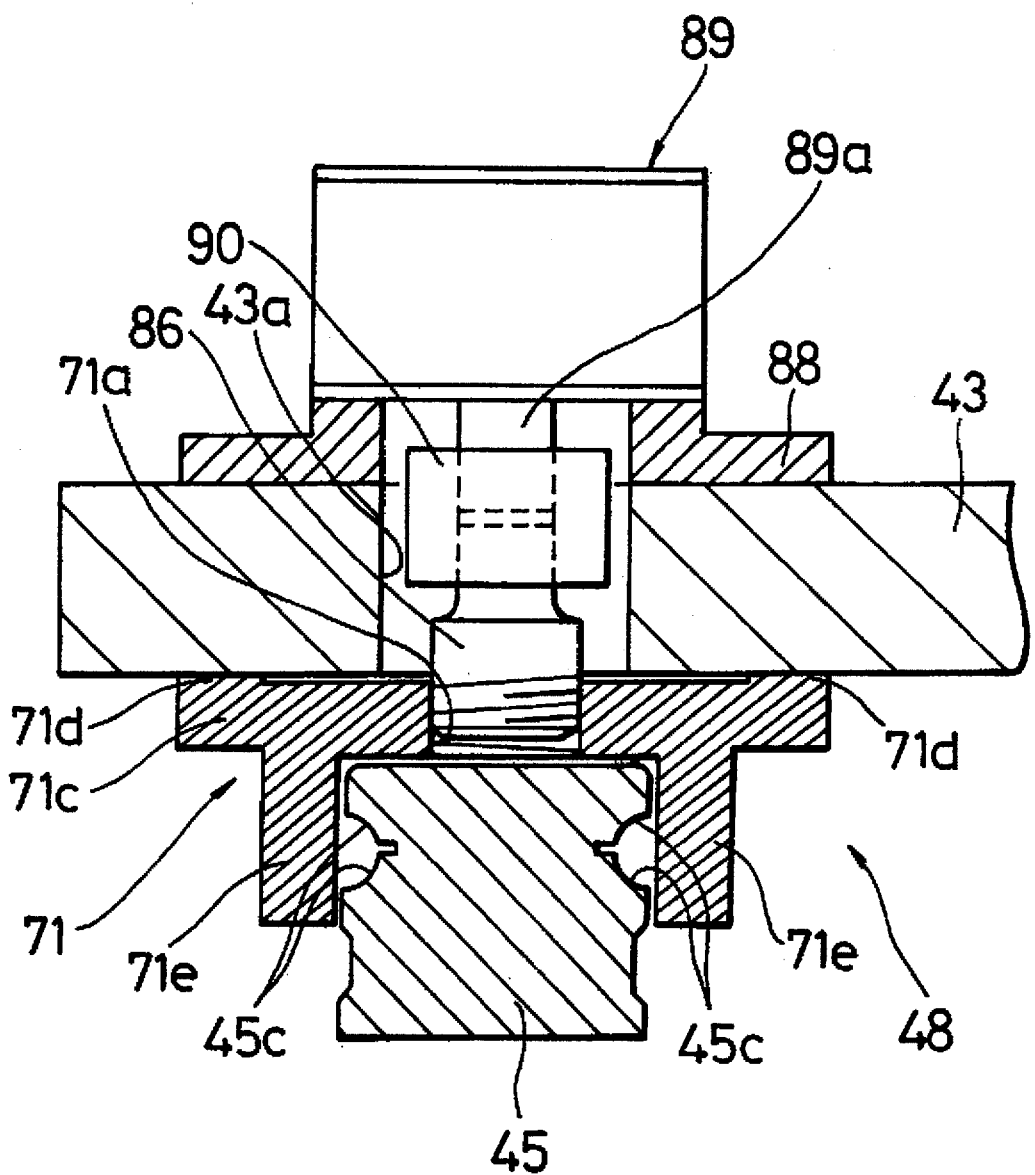
FIG. 15 is a vertical cross-sectional view of a fourth variation of the braking apparatus shown in FIG. 7.
Figure 16:
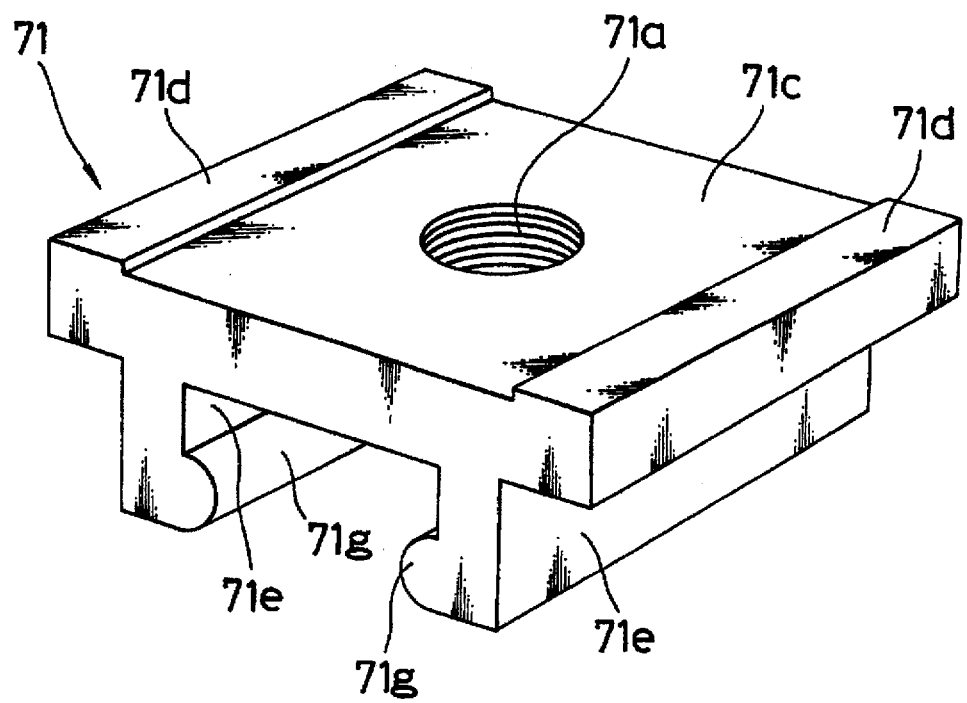

Moreover, in addition to the various types of bolts described above, a pushing device having the constitution shown in FIG. 15 may also be employed.

Namely, this pushing device is composed of stud bolt 86, the lower end of which is screwed into the central portion of base portion 71c of braking member 71, a driving control device in the form of hydraulic or pneumatic cylinder mechanism 89 mounted on table 43 by means of pedestal 88 so that output shaft 89a is facing downward, and coupler 90 that mutually couples output shaft 89a of said cylinder mechanism 89 and the upper end of the above-mentioned stud bolt 86. Since said cylinder mechanism 89 can be automatically and remotely controlled with respect to its operation, no matter how high an operation frequency braking apparatus 48 is required to have, and no matter how fast braking apparatus 48 is required to operate, together with these being able to be accommodated by automatic control, the operator is able to reduce his own range of movement by using remote control, thus enabling simplification of the work itself. Furthermore, in addition to said cylinder mechanism 89, other examples of a driving control device that enables automatic and remote control include the use of a solenoid plunger or piezoelectric element and so forth. In addition, the constitution is not limited to that in which output shaft 89a of said driving control device in the form of cylinder mechanism 89 is directly coupled to base portion 71c of braking member 71 as in the present embodiment, but rather a constitution may also be employed which juxtaposes a link mechanism or lever.

Figure 17:
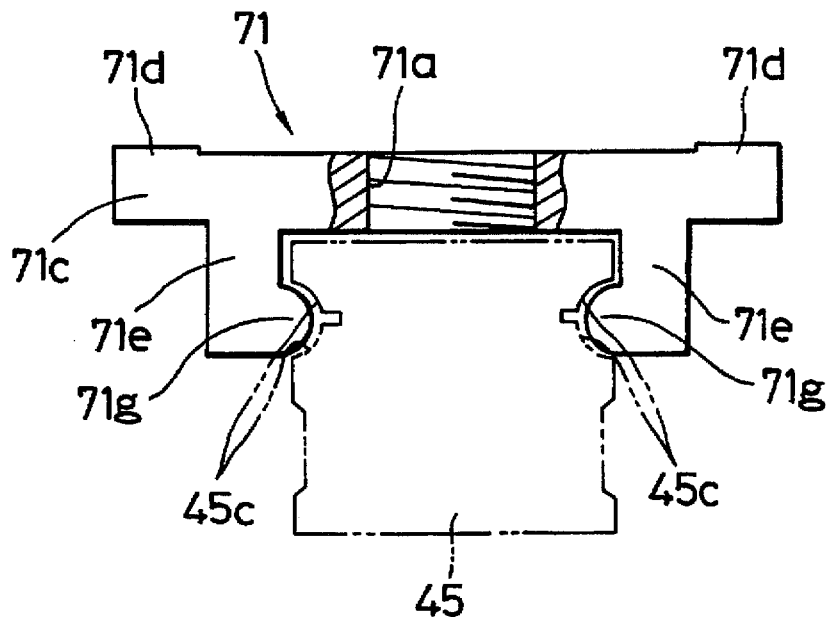
FIG. 17 is a front view, including a partial cross-section, showing the braking member shown in FIG. 16 and a track rail.
Figure 18:
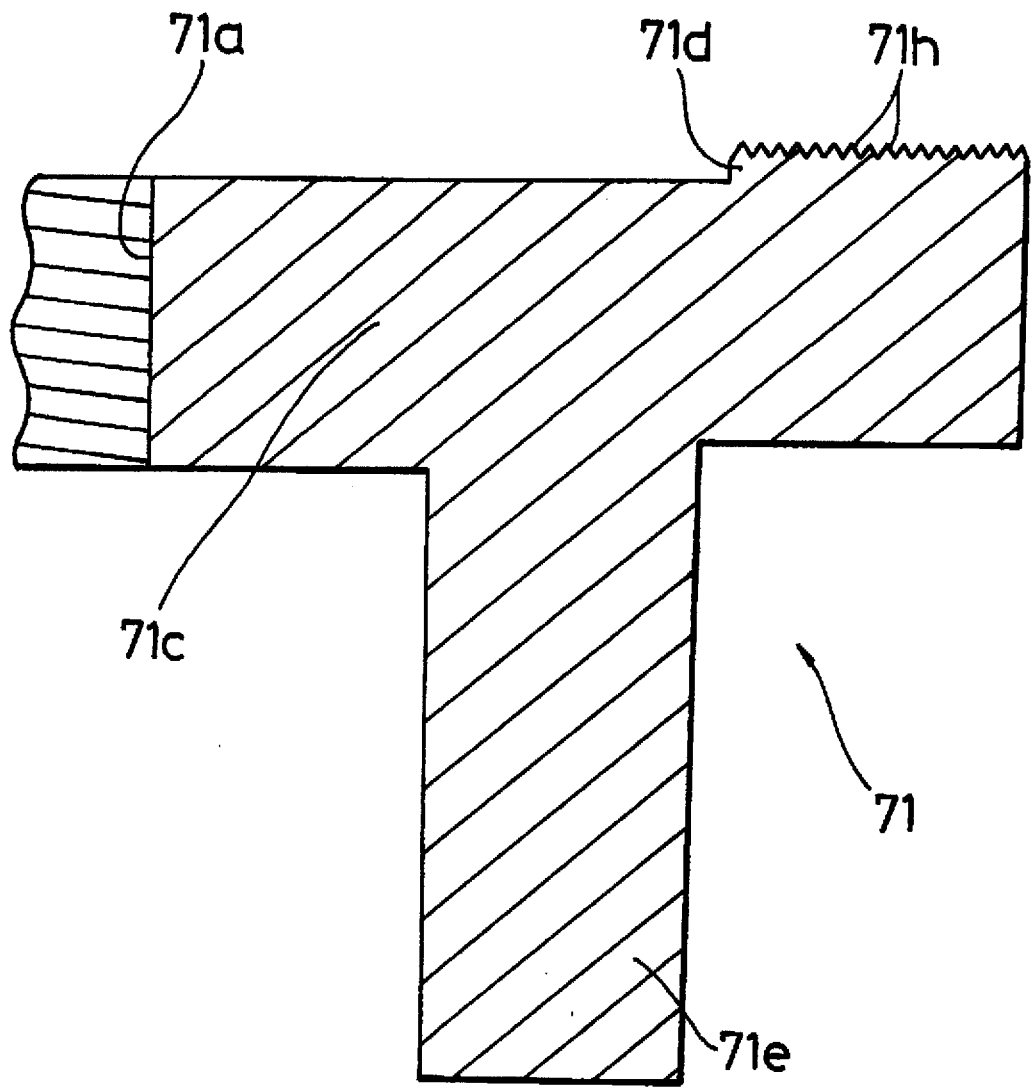
FIG. 18 is a perspective view of a braking member that is an essential portion of a fifth variation of the braking apparatus shown in FIG. 7.

In addition, although braking force is obtained by pressing against both the left and right sides of track rails 45 by both clamping portions 71e of braking member 71 in the above-mentioned embodiment, it is preferable to employ the constitution shown in FIGS. 18 and 17.

Namely, as shown in the drawings, tightly engaging portions 71g, having a roughly semicircular cross-sectional shape, and which are able to tightly engage with track grooves 45c formed in both sides of track rail 45, are formed on the inside of the lower end of both clamping portions 71e possessed by braking member 71 over the entire length of said clamping portions 71e. Accordingly, the contact surface area with track rail 45 is increased, thus resulting in the obtaining of large braking force.

Moreover, in the above-mentioned embodiment, although engaging surfaces, namely mounting surfaces, of engaging portions 71d, formed at two locations so as to engage with the lower surface of table 43, are formed in the form of smooth surfaces on base portion 71c possessed by braking member 71, as shown in FIG. 18, it is preferable that these surface be rough surfaces prepared by forming indentations 71h having a cross-section in the shape of, for example, a corrugated shape or a wavy shape. As a result of making the mounting surface rough in this manner, the adhesive strength of said braking member 71 with respect to table 43 is increased, thus preventing the occurrence of shifting and so forth by said braking member 71 resulting from the reaction of braking force. Furthermore, with respect to indentations 71h formed to produce a rough surface, said indentations 71h are formed by, for example, cutting a large number of small grooves in parallel along the lengthwise direction of said engaging portions 71d.

Figure 19:
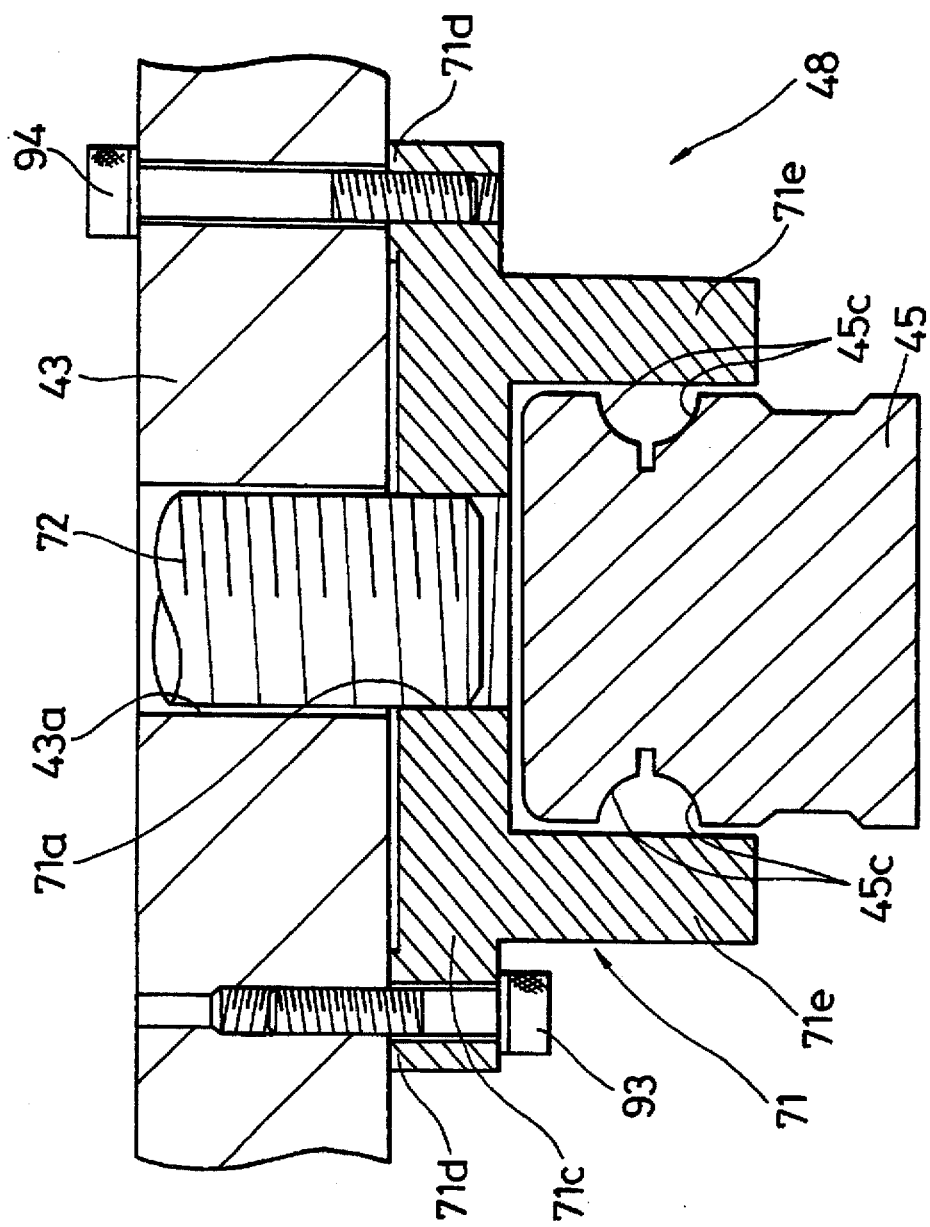
FIG. 19 is a vertical cross-sectional view showing the essential portion of a seventh variation of the braking apparatus shown in FIG. 7.

In addition, although braking member 71 is mounted in a state in which it is constantly in contact with the lower surface of table 43 in the above-mentioned present embodiment, as shown in FIG. 19, it is preferable that base portion 71c of said braking member 71 be fastened to table 43 by fastening members in the form of bolts 93 and 94 at engaging portions 71d where it engages with table 43. Furthermore, although one of the bolts 93 is installed from below with respect to base portion 71c and table 43 and the other bolt 94 is installed from above, both of these installation forms are suitably selected as necessary. As a result of fastening braking member 71 to table 43 in this manner, the resulting fixed state is extremely rigid, thereby preventing any occurrence whatsoever of shifting and so forth by braking member 71 due to the reaction of braking force.

Furthermore, although a pair of clamping portions 71e are formed over the entire length of braking member 71 on the left and right sides of said braking member 71 in the above-mentioned embodiment, in cases when braking member 71 is relatively long and so forth, it is not necessary to form said clamping portions 71e over the entire length of braking member 71, but rather only arrange short clamping portions in a row in the lengthwise direction of braking member 71. In addition, this applies similarly to engaging portions 71d provided on base portion 71c of braking member 71. Namely, although engaging portions 71d are formed over the entire length of braking member 71 on the left and right sides of said braking member 71 in the above-mentioned embodiment, it is not necessary that they be formed over the entire length, but rather short engaging portions may be provided in a row in the lengthwise direction of braking member 71. In addition, said engaging portions may be formed at any site with the exception of the site at which bolt 72 screws in.

However, in the above-mentioned embodiment, although a linear motion rolling guide unit is indicated that operates linearly as a rolling guide unit, a curved motion rolling guide unit can naturally also be applied in which the track rails and so forth are curved.

In addition, the present invention is not limited to the constitutions of the above-mentioned embodiment and variations, but rather each of those constitutions, and including portions thereof, can be suitably combined and mutually applied to be able to realize a diverse range of constitutions.

As has been explained above, according to the present invention, a braking apparatus for obtaining a fixed state is composed of a base portion that engages in at least two locations with a movable object, said movable object to perform relative motion with respect to track rails, and is formed so as to leave a gap between itself and said movable object, a braking member having clamping portions for clamping track rails which is integrated into a single unit with said base portion and extends so as to oppose both sides of the track rails while leaving gaps in between from the proximity of each of said engaging portions, and a pushing device for elastically deforming the above-mentioned base portion by pushing towards the above-mentioned movable object between the above-mentioned engaging portions at two locations- In this constitution, the above-mentioned base portion is elastically deformed by the pushing force applied by said pushing device, thus obtaining a fixed state as a result of the above-mentioned clamping portions clamping the track rails on an incline. In addition, when said pushing force is released, the above-mentioned base portion demonstrates restorative operation due to its own resiliency, thereby causing said clamping portions to move away from the track rails.

In said constitution, the member for producing braking force by clamping the track rails is essentially only the above-mentioned braking member, thus resulting in a smaller number of components in comparison with a braking apparatus that obtains a fixed state by means of a stationary plate (14) and a pair of braking members (16 and 17) as in the prior art. In addition, according to the present invention, since the above-mentioned base portion demonstrates restorative operation due to its own resiliency when the pushing force by the above-mentioned pushing device is released, and as a result, the above-mentioned clamping portions move away from the track rails, a special force applying device, such as coil spring (22) used in the prior art to promote release of the fixed state, is no longer necessary, thus also reducing the number of components.

Thus, in the braking apparatus according to the present invention, an extremely small number of components, simple construction, and reduced manufacturing cost are achieved. In addition, since the number of parts is reduced in this manner, there is less possibility of an operational error and so forth occurring caused by the penetration of dust and so forth into the relative operating portions of corresponding components, thus resulting in a high level of reliability.

In addition, the braking apparatus according to the present invention is not integrally assembled with respect to the sliders equipped in the rolling guide unit to be incorporated in said braking apparatus, but rather is provided separately from said sliders. Thus, since the brake apparatus is provided separately from the sliders of the rolling guide unit, in addition to the number of braking apparatuses being able to be increased or decreased as necessary, their handling, including their attachment and removal, is easy.

In addition, since the braking apparatus is separate from the sliders in this manner, said brake apparatus and sliders can be fabricated both simply and inexpensively, thereby achieving reduced cost and so forth of the entire rolling guide unit.

In addition, as a result of making the braking apparatus separate from the sliders, changes in internal force within said sliders, which have a detrimental effect on guiding properties, can be avoided. Incidentally, a constitution different from that of the present application, namely that in which a mechanism able to act as a braking apparatus is integrally incorporated, is disclosed in, for example, Japanese Examined Patent Publication No. 5-81766. In said constitution, each site that mutually engages with high accuracy, such as rolling elements or an endless track formed in a slider, in which said rolling elements circulate, cannot be prevented from being adversely affected in any way when, for example, a strong clamping force is applied or released.

In addition, in the braking apparatus according to the present invention, the above-mentioned clamping portions are arranged between the above-mentioned engaging portions at two locations, namely farther to the inside than said engaging portions. According to this constitution, in comparison with the case of arranging said clamping portions farther to the outside than said engaging portions at two locations, the inclination of said clamping portions is large, thereby resulting in increased braking force, in correlation with the angle of inclination of the curvature of deflection based on the elastic deformation of the above-mentioned base portion.

Moreover, in the braking apparatus according to the present invention, a plurality of the above-mentioned pushing devices, which applies pushing force so as to elastically deflect the base portion of the above-mentioned braking member, are provided in a row in the direction of relative motion of the movable object with respect to the track rails. Accordingly, a large braking force is produced, thus resulting in the obtaining of a rigid fixed state.

In addition, in the braking apparatus according to the present invention, the above-mentioned pushing device is composed of a fastening device in the form of a bolt and so forth that mutually fastens the above-mentioned base portion and a movable object. Consequently, with respect to said pushing device as well, the construction is extremely simple, thus enabling a further reduction in manufacturing cost.

In addition, in the braking apparatus according to the present invention, a thrust bearing, which receives fastening force in the form of an axial load, is juxtaposed between the portion to be turned during fastening equipped on the above-mentioned fastening device (the head portion of a bolt if, for example, a bolt is said fastening device), and the fastened site of the above-mentioned movable object, which receives said fastening force from said portion. Accordingly, frictional force that is produced between said portion and movable object is reduced to an extremely low level, thus enabling the obtaining of powerful fastening force, namely pushing force, with respect to minimal operating force.

In addition, in the braking apparatus according to the present invention, a handle for applying rotational force to a head portion is provided in the manner of, for example, the wings of a wing bolt, on the portion to be rotated during fastening equipped on the above-mentioned fastening device (said head portion if said fastening device is, for example, a bolt). In addition, in addition to said wings, the providing of a handle can also be performed in the form of a lever and so forth. By providing handles in this manner, the operator is able to perform rotation with his own hands, thus eliminating the need for the use of a tool such as a wrench,. and leading to improved workability. In this case, as indicated in the embodiment, if a fastening device is arranged so that the portion to be rotated (for example, the head portion of a bolt) is on the upper surface of table 43, said handle will not interfere with said table 43, thus enabling table 43 to be made large, namely having a large surface area. Incidentally, in the example of the prior art shown in FIG. 3 and so forth, if table 8 is made excessively large, the handle in the form of lever Z0 ends up interfering with said table 8.

Moreover, in the braking apparatus according to the present invention, a driving control device such as a cylinder mechanism and so forth that enables automatic control and remote control is employed for the above-mentioned pushing device. Thus, no matter how high an operation frequency the braking apparatus is required to have, and no matter how fast the braking apparatus is required to operate, together with these being able to be accommodated by automatic control, the operator is able to reduce his own range of movement by using remote control, thus enabling simplification of the work itself.

In addition, in the braking apparatus according to the present invention, a light metal such as aluminum is selected for the material of the above-mentioned braking member. As a result, the increase in inertial force when said braking member is attached to said movable object is held to a low level, which is particularly effective in the case of operating said movable object at high speeds.

In addition, in the braking apparatus according to the present invention, tightly engaging portions, that are able to tightly engage with the tracks formed in the track rails, are formed in the clamping portions possessed by the above-mentioned braking member. Accordingly, the contract surface area with the track rails is increased, thus resulting in the obtaining of large braking force.

Next, in the braking apparatus according to the present invention, the engaging surfaces, namely the mounting surfaces, of the base portion of the above-mentioned braking member with respect to the above-mentioned movable object are rough. As a result, the adhesive strength of said braking member with respect to said movable object is increased, thus preventing the occurrence of shifting and so forth by said braking member resulting from the reaction of braking force.

In addition, in the braking apparatus according to the present invention, the engaging portion, namely the mounting portions, of the base portion of the above-mentioned braking member with respect to the above-mentioned movable object are fastened to said movable object by a fastening member. Accordingly, the resulting fixed state of said braking member to said movable object is extremely rigid, thereby preventing any occurrence whatsoever of shifting and so forth by said braking member due to the reaction of braking force.

What is claimed is:

1. A braking apparatus equipped with: a base portion that engages with a movable object in at least two locations, said movable object to perform relative motion with respect to a prescribed track rail, and is formed so that a gap is produced with said movable object between said two engaging portions; braking members having a plurality of clamping portions for clamping said track rail that are integrated with said base portion and extend from the vicinity of each of said engaging portions so as to oppose both sides of said track rail with gaps in between; and, a pushing device for elastically deforming said base portion by pushing toward said movable object between said two engaging portions.

2. The braking apparatus as set forth in claim 1 wherein said clamping portions are arranged between said engaging portions at two locations.

3. The braking apparatus as set forth in claim 1 wherein said pushing device is provided in plural arranged in a row in the direction of said relative motion.

4. The braking apparatus as set forth in claim 1 wherein said pushing device is composed of a fastening device that mutually fastens said base portion and said movable object.

5. The braking apparatus as set forth in claim 4 wherein a thrust bearing able to receive said fastening force in the form of an axial load is juxtaposed between the portion to be rotated during fastening equipped on said fastening device and a fastened site of said movable object that receives fastening force from said portion.

6. The braking apparatus as set forth in claim 4 wherein a handle is provided on the portion to be rotated during fastening equipped on said fastening device for applying rotational force to said portion.

7. The braking apparatus as set forth in claim 1 wherein said pushing device is composed of a driving control device such as a cylinder mechanism.

8. The braking apparatus as set forth in claim 1 wherein said braking member is composed with a light metal.

9. The braking apparatus as set forth in claim 1 wherein tightly engaging portions are formed in said clamping portions that are able to tightly engage with tracks formed in said track rail.

10. The braking apparatus as set forth in claim 1 wherein the engaging surfaces of said base portion with respect to said movable object are rough.

11. The braking apparatus as set forth in claim 1 wherein the engaging portions of said base portion with respect to said movable object are fastened to said movable object by a fastening member.

12. A rolling guide unit equipped with: track rails in which tracks are formed along the lengthwise direction; sliders having a rolling element circulating path that includes load bearing tracks corresponding to said tracks, and which are able to freely perform relative movement with respect to said track rails and are coupled to a prescribed movable object; a plurality of rolling elements that are arranged and contained within said rolling element circulating path, and which bear the load by rolling along said tracks; and, a braking apparatus that mutually brakes said track rails and sliders; wherein, said braking apparatus is equipped with a base portion that engages with a movable object in at least two locations, and is formed so that a gap is produced with said movable object between said two engaging portions; braking members having a plurality of clamping portions for clamping said track rail that are integrated with said base portion and extend from the vicinity of each of said engaging portions so as to oppose both sides of said track rail with gaps in between; and, a pushing device for elastically deforming said base portion by pushing toward said movable object between said two engaging portions.

* * * * *